United States Patent [19]

Ampferer et al.

[11] Patent Number: 4,823,748
[45] Date of Patent: Apr. 25, 1989

[54] ACTUATING ARRANGEMENT

[75] Inventors: Herbert Ampferer, Sachsenheim; Klaus Groeger, Hemmingen, both of Fed. Rep. of Germany

[73] Assignee: Dr. Ing. h.c.F. Porsche Aktiengesellschaft, Stuttgart, Fed. Rep. of Germany

[21] Appl. No.: 92,882

[22] Filed: Sep. 4, 1987

[30] Foreign Application Priority Data

Sep. 6, 1986 [DE] Fed. Rep. of Germany ....... 3630432

[51] Int. Cl.$^4$ ............................................. F02D 9/08
[52] U.S. Cl. .................................... 123/336; 74/108; 123/52 MV; 123/583; 137/595; 251/228
[58] Field of Search ......... 123/52 M, 52 MV, 55 VF, 123/55 VS, 55 VE, 55 V, 59 PC, 308, 432, 442, 583, 584, 336, 337; 74/581, 108; 137/595, 601; 251/228, 279, 305

[56] References Cited

U.S. PATENT DOCUMENTS

| 2,420,925 | 5/1947 | Wirth | 123/59 PC |
| 2,761,437 | 9/1956 | Stolte | 123/583 X |
| 2,791,205 | 5/1957 | Platner et al. | 123/52 MV X |
| 4,016,838 | 4/1977 | Yoshioka et al. | 123/59 PC |
| 4,473,049 | 9/1984 | Jahr | 123/396 |
| 4,566,424 | 1/1986 | Billingsley et al. | 123/583 |
| 4,632,082 | 12/1986 | Hattori et al. | 123/325 |

FOREIGN PATENT DOCUMENTS

| 1986850 | 4/1963 | Fed. Rep. of Germany . |
| 3044292 | 6/1982 | Fed. Rep. of Germany . |
| 3503951 | 8/1986 | Fed. Rep. of Germany . |
| 126320 | 6/1986 | Japan . |
| 182167 | 9/1936 | Switzerland . |

Primary Examiner—Tony M. Argenbright
Attorney, Agent, or Firm—Barnes & Thornburg

[57] ABSTRACT

An actuating arrangement connected with throttle valves of suction pipes of an internal combustion engine which are to be actuated synchronously. The throttle valves include bearing shafts and cooperate by way of levers with a linkage of the actuating arrangement. For the compensation of tolerances of the actuating arrangement, especially angular tolerances of the throttle valves, yielding members are provided between the linkage and the bearing shafts, and a device stresses the throttle valves into the closed end positions.

12 Claims, 5 Drawing Sheets

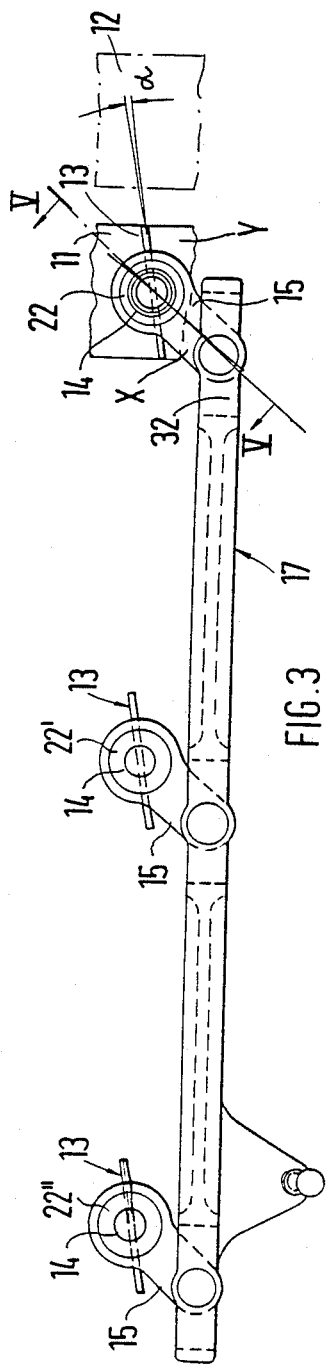
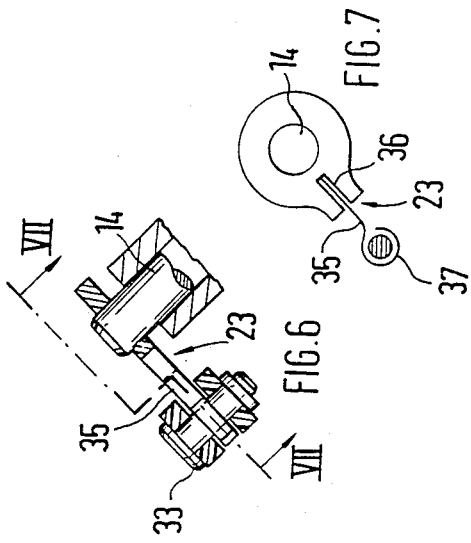
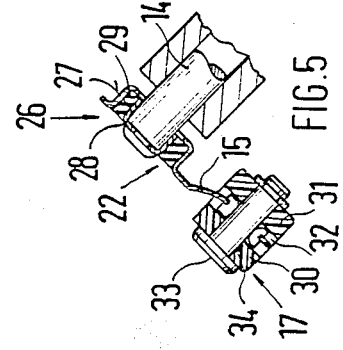

ACTUATING ARRANGEMENT

BACKGROUND AND SUMMARY OF THE INVENTION

The present invention relates to an actuating arrangement for several throttle valves belonging preferably to a structural group of a suction pipe of a multi-cylinder internal combustion engine, whereby the throttle valves to be actuated synchronously are connected with their bearing shafts to levers extending outside of the suction pipe, and the bearing shafts cooperate with a common linkage.

In a known internal combustion engine (DE-GM No. 19 86 850), two separate suction pipes are led to a cylinder which includes two inlet valves. Both suction pipes are provided with throttle valves which are adjusted independently of one another.

It is the object of the present invention to undertake such measures in an actuating arrangement of several suction pipe-throttle valves of a multi-cylinder internal combustion engine, which are to be synchronously actuated, that the actuating arrangement can be easily installed and customary tolerances which always result between individual throttle valves are compensated without special adjusting operations.

The underlying problems are solved according to the present invention in that yielding members are provided between the linkage and the bearing shafts of the throttle valves and a device stressing the throttle valves into their closed end positions by means of the levers engages at the linkage.

The principal advantages obtainable with the present invention reside in that customary tolerances which could be reduced only with an unacceptably high expenditure are compensated by the elastic elements and the device stressing the throttle valves into their closed end position. It is assured thereby that in the closed position of the throttle valves no medium--fuel-air-mixture--reaches the combustion space by way of the mentioned valves. This is of particular significance in internal combustion engines with two inlet valves and two separate suction pipe sections per cylinder, of which at least one of these sections is provided with a throttle valve adapted to be turned on and off. The possibility exists with this type of suction pipe construction to considerably improve the torque curve of the internal combustion engine at low and middle rotational speeds.

The elastic or yielding members can be formed in a simple manner by rotationally elastic bearings which are coordinated to the levers. By means of the single actuating rod, not only the structural expenditure is reduced, but also the assembly and adjusting operation of the actuating mechanism is facilitated.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 3 is a cross-sectional view taken along line III—III of FIG. 1;

FIG. 5 is a cross-sectional view taken along line V—V of FIG. 3;

FIG. 6 is a cross-sectional view corresponding to FIG. 5 of a modified embodiment in accordance with the present invention;

FIG. 7 is a cross-sectional view, taken along line VII—VII of FIG. 6;

DETAILED DESCRIPTION OF THE DRAWINGS

Figure 1:
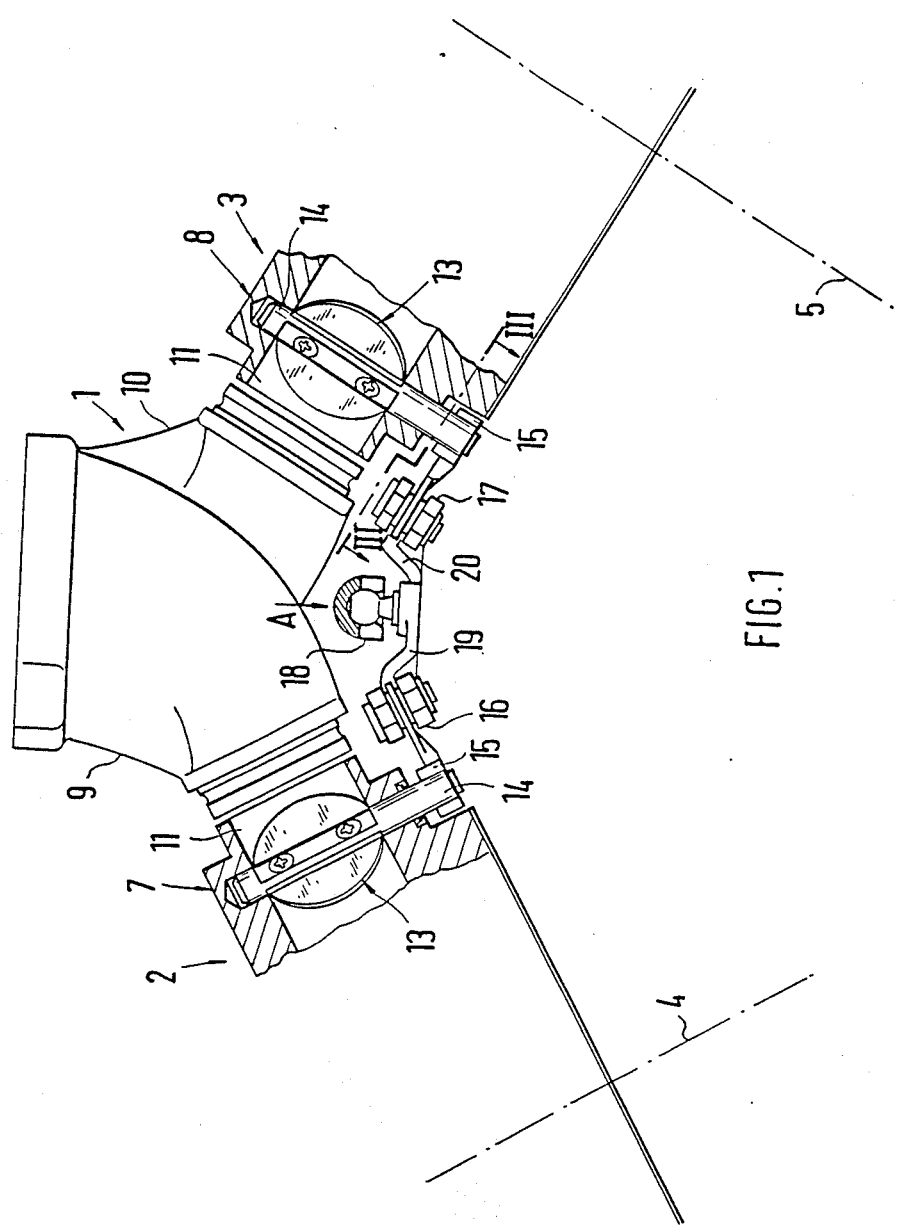
FIG. 1 is a partial cross-sectional view of an internal combustion engine in accordance with the present invention within the area of suction pipes.
Figure 2:
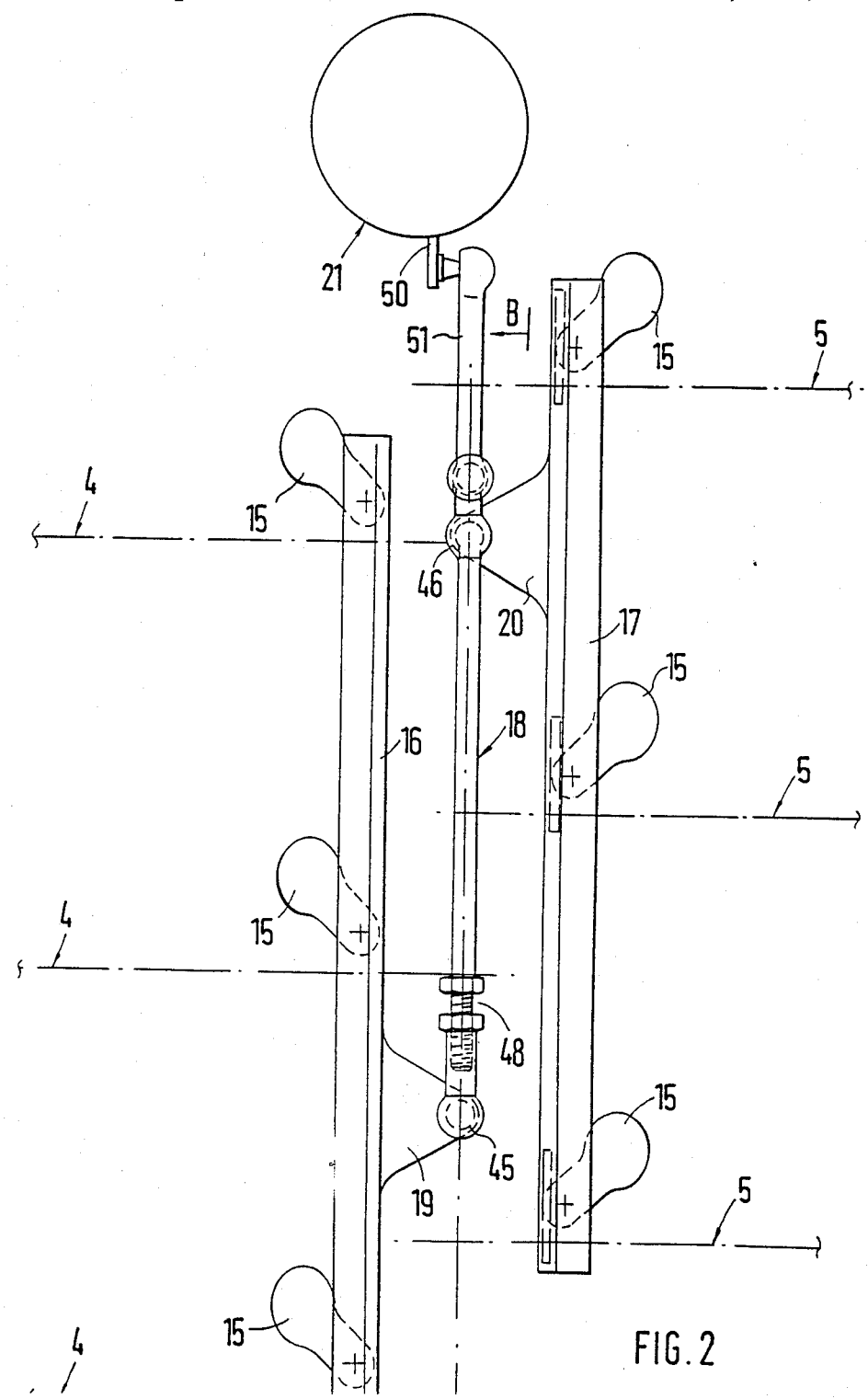
FIG. 2 is a plan view taken in the direction of arrow A of FIG. 1.
Figure 4:
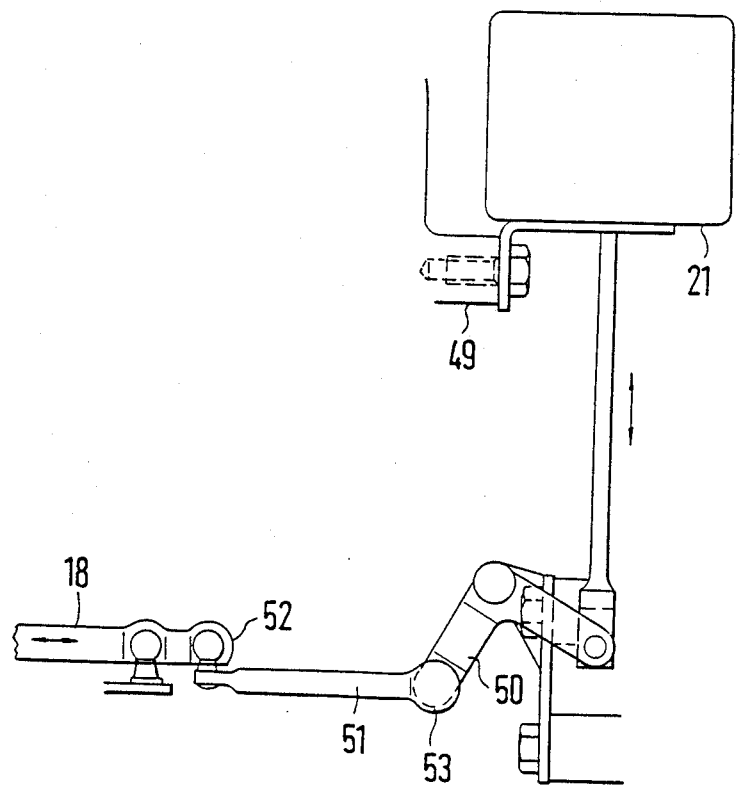
FIG. 4 is an elevational view taken in the direction of arrow B of FIG. 2.

Referring now to the drawing wherein like reference numerals are used throughout the various views to designate like parts, the internal combustion engine generally designated by reference numeral 1 (FIG. 1) includes V-shaped arranged cylinder rows 2 and 3 whose center longitudinal axes are designated by reference numerals 4 and 5; each cylinder row includes three cylinders (FIG. 2).

The cylinder rows 2 and 3 include cylinder heads 8 (not illustrated in detail) which are provided with two inlet valves per cylinder which is also not illustrated. Suction pipes 9 and 10 (FIG. 1) which have separate suction pipe sections 11 and 12 (FIG. 3) for a given cylinder, are connected in series ahead of the inlet valves.

Only the suction pipe sections 11 are provided with throttle valves 13, i.e., during the operation of the internal combustion engine, its combustion spaces are constantly supplied with medium—a fuel-air-mixture—by way of the suction pipe sections 12. In contrast, the suction pipe sections 11 are closed by means of the throttle valves 13 up to a defined middle rotational speed of the internal combustion engine, as a result of which its torque curve is improved in the mentioned operating range.

The throttle valves 13 are secured at bearing shafts 14 aligned parallel to the center longitudinal axes 4 and 5 (FIG. 1); the bearing shafts 14 are extended out of the suction pipe section 11 on one side and are provided with levers 15. The levers 15 cooperate with linkages 16 and 17 in such a manner that the throttle valves 13 are actuated synchronously whereby the levers 15 of a cylinder row 4 or 5 are actuated by means of a single linkage 16 or 17.

An actuating rod 18 (FIGS. 1 and 3) extends between the parallelly extending linkages 16 and 17 which cooperates with lateral brackets 19 and 20 of the linkages 16 and 17 and with a device 21 (FIG. 2). The device 21 is a vacuum-adjusting device which displaces the throttle valves 13 into end positions—open or closed.

In order to assure that all throttle valves 13 cooperate in their closed end positions with the suction pipe sections 11 in a medium-tight manner, resilient members 22, 23, 24 and 25 are provided between the linkages 16 and 17 and the bearing shafts 14 which under the force influence of the device 21 compensate tolerances of the actuating mechanism, preferably angular tolerances of the throttle valves 13.

Each member 22 is formed by a rotationally elastic bearing generally designated by reference numeral 26 which is arranged between the bearing shaft 14 and the lever 15 (FIG. 5). The bearing 26 is formed by a pot-shaped section 27 of the lever 15 and a sleeve 28 fixed on the bearing shaft 14 which are connected with each other by means of an elastic body 29.

For mounting the lever 15 at the linkage 17 consisting of plastic material, the latter includes a mounting section 32 having parallel walls 30 and 31. The lever 15 extends between the walls 30 and 31. The connection between the lever 15 and the linkage 16 is established by means of a bolt 33 which extends through a bore 34 of the linkage 17.

According to FIGS. 6 and 7, the member 23 is formed by an elastic section 35 which is fixed in an aperture 36 of the lever 14. The free end of the section 35 is provided with an eyelet 37 surrounding the bolt 33.

Figure 8:
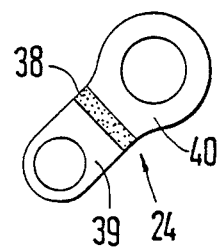
FIG. 8 is a view of the detail X of FIG. 3 with a further embodiment on an enlarged scale.

In FIG. 8, the member 24 is an elastic body 38 which is secured between the parts 39 and 40 of the lever 14 by adhesion, vulcanization or the like.

Figure 9:
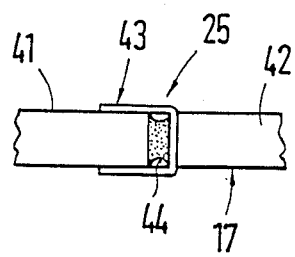
FIG. 9 is a partial view of FIG. 3 with a further embodiment, on an enlarged scale.

Additionally, the possibility exists to construct the member 25 as axially movable device and to integrate the same into the linkage 17 between two levers 15 which can be seen from FIG. 9. According to FIG. 9, the linkage 17 is represented by two parts 41 and 42. The part 41 is telescopically guided in a guidance 43 of the part 42 whereby an elastic body 44 is arranged between the guidance 43 and the part 41, which, for example, is connected with the latter by a material connection.

The actuating device 18 which cooperates by way of ball-head connections 45 and 46 with the brackets 19 and 20 of the linkages 16 and 17, includes at 47 an adjusting device 48; the latter serves for the longitudinal adjustment of the actuating rod 18 (FIG. 2).

A knee lever 50 and a connecting lever 51 are provided between the actuating rod 18 and the device 21 secured at a housing 49 of the internal combustion engine 1. The connecting lever 51 cooperates with the actuating rod 18 and the angle lever 50 by way of the ball head connections 52 and 53.

Figure 10:
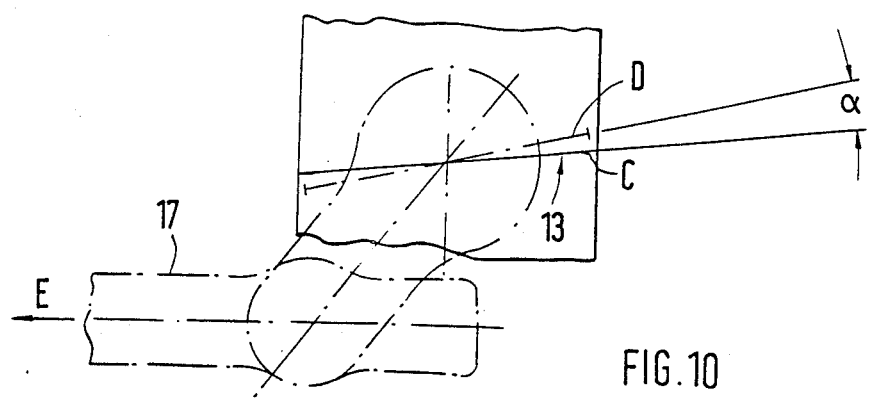
FIG. 10 is a view of the detail Y of FIG. 3, on an enlarged scale.

In FIG. 10, the design position C and a possible tolerance position D of the throttle valves 13 are illustrated. This tolerance position D, which is determined by the angle α, is compensated in that the device 21 pulls the linkage 17 in the direction E, and more particularly under deformation of the members 22' and 22'' (FIG. 3) which structurally correspond to the member 22, and more particularly for such length of time until the throttle valve 13 assumes its design (engineering) position C. Insofar as one or several throttle valves of the linkage 16 has or have a differing tolerance position, this can be eliminated by the adjusting device 48.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An actuating arrangement for several throttle valves belonging to suction pipes which are to be actuated synchronously, each throttle valve including a bearing shaft operatively connected with lever means extending outside of the suction pipes, a common linkage means for said lever means, yielding means between the linkage means and the bearing shafts for compensating variances in valve closed end position due to tolerance differences of the valves while maintaining synchronized opening movement thereof, and further means at the linkage means stressing the throttle valves by means of the lever means into closed positions.

2. An actuating arrangement according to claim 1, wherein said several throttle valves belong to a structural group of suction pipes of a multi-cylinder internal combustion engine.

3. An actuating arrangement according to claim 1, wherein a respective yielding means is formed by a rotational elastic bearing means which is provided between the respective bearing shaft and its lever means.

4. An actuating arrangement according to claim 3, wherein the bearing means is formed by a pot-shaped section of the lever means and by a sleeve fixed on the bearing shaft, the sleeve and the section of the lever means being connected with each other by an elastic body means.

5. An actuating arrangement according to claim 1, wherein a respective yielding means is formed by an elastic body means having two parts and integrated into the corresponding lever means.

6. An actuating arrangement according to claim 1, wherein a respective yielding means is formed by an elastic section of the lever means.

7. An actuating arrangement according to claim 1, wherein a respective yielding means is formed by an axially movable means at the linkage means.

8. An actuating arrangement according to claim 1, in which the internal combustion engine includes suction pipes arranged at cylinder rows arranged in V-shape, wherein the linkage means of the throttle valves of the suction pipes of both cylinder rows are moved by means of a single actuating rod operatively connected with the further means, and said actuating rod extending between the linkage means.

9. An actuating arrangement according to claim 8, wherein the actuating rod cooperates with bracket means extending away from the linkage means.

10. An actuating arrangement according to claim 8, wherein the actuating rod includes a means for a longitudinal adjustment.

11. An actuating arrangement according to claim 1, wherein each linkage means includes within the area of the lever means a mounting section having parallel walls, and the lever means extending between the walls.

12. An actuating arrangement according to claim 11, wherein each linkage means consists of plastic material.

* * * * *